US012801148B2

(12) United States Patent
Chung et al.

(10) Patent No.: US 12,801,148 B2
(45) Date of Patent: Nov. 17, 2026

(54) MOBILE ROBOT UTILIZING THE UNCERTAINTY OF MAP MATCHING POSES FOR LOCALIZATION

(71) Applicant: KOREA UNIVERSITY RESEARCH AND BUSINESS FOUNDATION, Seoul (KR)

(72) Inventors: WooJin Chung, Seoul (KR); GeonHyeok Park, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 19/184,909

(22) Filed: Apr. 21, 2025

(65) Prior Publication Data

US 2025/0334969 A1 Oct. 30, 2025

(30) Foreign Application Priority Data

Apr. 25, 2024 (KR) ........................ 10-2024-0055164

(51) Int. Cl.
*G05D 1/246* (2024.01)
*G05D 1/248* (2024.01)
(Continued)

(52) U.S. Cl.
CPC ............. *G05D 1/246* (2024.01); *G05D 1/248* (2024.01); *G06N 7/01* (2023.01); *G05D 2109/10* (2024.01);
(Continued)

(58) Field of Classification Search
CPC .... G05D 1/246; G05D 1/248; G05D 2111/17; G05D 2111/52; G05D 2109/10; G06N 7/01
See application file for complete search history.

(56) References Cited

U.S. PATENT DOCUMENTS

2021/0303908 A1* 9/2021 Myeong ................. G06V 20/56
2021/0331317 A1* 10/2021 Whitman ............... B25J 9/1666
(Continued)

OTHER PUBLICATIONS

Shan, Tixiao et al.; "LeGO-LOAM: Lightweight and Ground-Optimized Lidar Odometry and Mapping on Variable Terrain;" 2018 IEEE/RSJ International Conference on Intelligent Robots and Systems; Oct. 2018; pp. 4758-4765.
(Continued)

*Primary Examiner* — Hussein Elchanti
(74) *Attorney, Agent, or Firm* — Studebaker Brackett PLLC

(57) ABSTRACT

Proposed is a mobile robot utilizing the uncertainty of map matching poses for localization. The mobile robot includes a point cloud sensor which acquires point cloud data through scanning, a matching pose calculation part which applies a pre-registered point cloud map and the point cloud data to a pre-registered scan-map matching algorithm to calculate a map-matching pose of the mobile robot, and an uncertainty estimation part which estimates uncertainty of the map-matching pose on the basis of a probability distribution of a preset pose space around the map-matching pose. Through this, the uncertainty of the map-matching pose is estimated to evaluate the reliability of the map-matching pose, enabling more precise localization.

11 Claims, 13 Drawing Sheets

(51) Int. Cl.

| | |
|---|---|
| ***G06N 7/01*** | (2023.01) |
| *G05D 109/10* | (2024.01) |
| *G05D 111/10* | (2024.01) |
| *G05D 111/50* | (2024.01) |

(52) U.S. Cl.
CPC ...... *G05D 2111/17* (2024.01); *G05D 2111/52* (2024.01)

(56) References Cited

U.S. PATENT DOCUMENTS

| | | | | |
|---|---|---|---|---|
| 2021/0331754 | A1* | 10/2021 | Whitman | B62D 57/024 |
| 2023/0256597 | A1* | 8/2023 | Zeng | B25J 9/163 700/259 |
| 2023/0311309 | A1* | 10/2023 | Jaekel | B25J 9/161 700/254 |
| 2024/0324838 | A1* | 10/2024 | Ebrahimi Afrouzi | G05D 1/2446 |
| 2024/0383560 | A1* | 11/2024 | Xiang | G05D 1/027 |

OTHER PUBLICATIONS

Shan, Tixiao et al.; "LIO-SAM: Tightly-coupled Lidar inertial Odometry via Smoothing and Mapping;" 2020 IEEE/RSJ International Conference on Intelligent Robots and System; Jul. 14, 2020; pp. 5135-5142.
Koide, Kenji et al.; "A portable three-dimensional LIDAR-based system for long-term and wide-area people behavior measurement;" International Journal of Advanced Robotic Systems; Feb. 22, 2019; vol. 16, No. 2; pp. 1-16.

* cited by examiner

MOBILE ROBOT UTILIZING THE UNCERTAINTY OF MAP MATCHING POSES FOR LOCALIZATION

CROSS REFERENCE TO RELATED APPLICATION

The present application claims priority to Korean Patent Application No. 10-2024-0055164, filed Apr. 25, 2024, the entire contents of which are incorporated herein for all purposes by this reference.

BACKGROUND OF THE INVENTION

Field of the Invention

The present disclosure relates generally to a mobile robot. More particularly, the present disclosure relates to a mobile robot utilizing the uncertainty of map matching poses for localization.

Description of the Related Art

Recently, there has been increasing interest in applying a mobile robot to various outdoor works such as delivery, construction, and exploration. A key requirement for safe operation of the mobile robot outdoors is the ability to perform robust and reliable localization in a variety of environments.

One approach to estimating the pose of a robot is to use sensors capable of perceiving surrounding environment thereof. Among these sensors, a vision sensor is widely used because it is inexpensive and is capable of providing rich semantic information about work environment. However, the vision sensor is affected by lighting conditions, so performance thereof may degrade in low-light scenarios, especially during night operations.

In contrast to the vision sensor, a LiDAR sensor is less sensitive to light and thus is suitable for outdoor localization. Additionally, LiDAR is capable providing accurate 3D environmental information over a wide range.

The LiDAR odometry presented in Shan, T., and Englot, B.'s paper, "*Lego-loam: Lightweight and Ground-Optimized Lidar Odometry and Mapping on Variable Terrain*" (2018 IEEE/RSJ International Conference on Intelligent Robots and Systems, pp. 4758-4765), and the LiDAR-inertial odometry detailed in the paper by Shan, T. et al., titled "*LIO-SAM: Tightly-coupled lidar inertial odometry via smoothing and mapping*" (2020 IEEE/RSJ International Conference on Intelligent Robots and System, pp. 5135-5142), are common approaches adopted for estimating ego-motion.

The above methods are particularly effective for short-term localization or simultaneous localization and mapping (SLAM) in unknown environments. On the other hand, the above methods have a fundamental problem that odometry errors accumulate over long travel distances.

Meanwhile, map-based localization is widely used to determine the global pose of a mobile robot. Typically, existing studies have used 2D grid maps that include intensity or altitude information.

While 2D maps may be efficient in simple environments, the complexity of dynamic outdoor environments requires the use of 3D maps to obtain more reliable localization results.

TO effectively 3D utilize geometric information, a localization method based on a 3D point cloud map was proposed. As an example, there is the paper by Koide, K., Miura, J., and Menegatti, E., titled "*A portable three-dimensional lidar-based system for long-term and wide-area people behavior measurement*" (2019, International Journal of Advanced Robotic Systems, 16(2), 1729881419841532. doi: 10.1177/1729881419841532).

A scan matching algorithm was used to estimate poses from a point cloud map. For example, useful scan matching algorithms such as an iterative closest point (ICP) algorithm and a normal distribution transform (NDT) algorithm have been proposed. 3D map matching-based localization methods may provide accurate global poses in various situations, but performance thereof may deteriorate in certain environments.

The pose of a mobile robot estimated through map matching may not be accurate in environments with insufficient features or repetitive environmental structures. Additionally, map matching has a fundamental limitation in that it is difficult to accommodate environmental changes that occur after a map is created.

This may act as a factor that significantly reduces the accuracy of localization when an incorrect map-matching pose is used for localization. Therefore, it is essential to evaluate the reliability of the map-matching pose and remove incorrect poses.

SUMMARY OF THE INVENTION

Accordingly, the present disclosure has been made keeping in mind the above problems occurring in the related art, and the present disclosure is intended to provide a mobile robot utilizing the uncertainty of map matching poses for localization, in which the mobile robot is capable of estimating the uncertainty of a map matching pose and evaluating the reliability of the map matching pose.

In addition, the present disclosure is intended to provide a mobile robot capable of more accurate pose estimation by considering the uncertainty of the map-matching pose in estimating the pose of the mobile robot.

Furthermore, the present disclosure is intended to provide a mobile robot capable of precise localization by integrating complementary measurements for pose estimation together with the map-matching pose.

In order to achieve the objectives of the present disclosure, there is provided a mobile robot utilizing the uncertainty of map matching poses for localization, the mobile robot including: a point cloud sensor which acquires point cloud data through scanning; a matching pose calculation part which applies a pre-registered point cloud map and the point cloud data to a pre-registered scan-map matching algorithm to calculate a map-matching pose of the mobile robot; and an uncertainty estimation part which estimates uncertainty of the map-matching pose on the basis of a probability distribution of a preset pose space around the map-matching pose.

Here, the matching pose calculation part may calculate the map-matching pose by applying a normal distribution transform (NDT) algorithm as the scan-map matching algorithm.

In addition, the uncertainty estimation part may calculate the probability distribution of the pose space by applying a histogram filter algorithm to the pose space.

In addition, the histogram filter algorithm may divide the pose space into a plurality of grid cells, and calculate a posterior probability of each of the grid cells to calculate the probability distribution of the pose space.

In addition, the uncertainty estimation part may calculate the posterior probability of each of the grid cells by using a likelihood calculated in the process of calculating the map-matching pose of the scan-map matching algorithm.

In addition, the uncertainty estimation part may calculate the posterior probability of each of the grid cells by applying Bayes' rule.

In addition, the uncertainty estimation part may estimate the uncertainty by calculating a covariance of the probability distribution for the posterior probability of the plurality of grid cells.

In addition, the covariance may be calculated by mathematical expression $$\mathrm{cov}(\hat{x}) = \frac{1}{s}K - \frac{1}{s^2}uu^T$$

(Here, $\mathrm{cov}(\hat{x})$ is the covariance for the map-matching pose and K, u, and s are calculated by mathematical expression $$K = \sum_k \hat{x}_k \hat{x}_k^T p(\hat{x}_k|z, m)^\alpha$$
$$u = \sum_k \hat{x}_k p(\hat{x}_k|z, m)^\alpha ,$$
$$s = \sum_k p(\hat{x}_k|z, m)^\alpha$$

wherein $\hat{x}_k$ is a pose for the grid cell, $p(\hat{x}_k|z, m)$ is the posterior probability for the pose $\hat{x}_k$, and an exponent $\alpha$, which is a constant set to adjust a value of the posterior probability, is a value less than 1).

In addition, the map-matching pose $\hat{x}$ may be represented as $[x, y, z, \phi, \theta, \psi]^T$, wherein x, y, and z are 3D coordinates, respectively, and $\phi$, $\theta$, and $\psi$, which are Euler angles, are roll, pitch, and yaw, respectively; and the pose space may be set to x, y, and $\psi'$, wherein a diagonal element of the covariance for z for the map-matching pose $\hat{x}$ is assigned on the basis of diagonal elements of x and y, and diagonal elements for $\phi$ and $\theta$ are assigned on the basis of a diagonal element of $\psi$.

In addition, the mobile robot may further include: at least one individual pose calculation part for calculating the pose of the mobile robot in a different manner from the matching pose calculation part; and an integrated pose estimation part which estimates an integrated pose of the mobile robot on the basis of the map-matching pose calculated by the matching pose calculation part and the pose calculated by the individual pose calculation part, wherein the uncertainty estimated by the uncertainty estimation part is considered in the integrated pose.

In addition, the integrated pose estimation part may estimate the integrated pose by using a factor graph which uses the pose calculated by the individual pose calculation part and the map-matching pose as constraints.

In addition, the mobile robot may further include: an IMU sensor which measures linear acceleration and an angular velocity, and a GNSS module which measures GNSS-based position information, wherein the individual pose calculation part may include: an IMU-based pose calculation part which calculates a local pose for each of key points to be input into the factor graph on the basis of the linear acceleration and the angular velocity measured by the IMU sensor; a LiDAR odometry-based pose calculation part which compares the point cloud data between one adjacent pair of the key points and calculates relative change in pose between the key points; and a GNSS-based pose calculation part which converts the position information measured by the GNSS module into coordinate information on the point cloud map to calculate a GNSS global pose, wherein the integrated pose estimation part may estimate the integrated pose by using the local pose, the relative change, the GNSS global pose, and the map-matching pose as constraints of the factor graph.

In addition, the integrated pose estimation part may apply the uncertainty calculated for the map-matching pose as a weight of the map-matching pose for the estimation of the integrated pose. In addition, the integrated pose estimation part may not consider the corresponding map-matching pose in the estimation of the integrated pose when the uncertainty of the map-matching pose is greater than a preset reference value.

In addition, the integrated pose estimation part may compare a sum of an x-axis direction component and a y-axis direction component of the uncertainty with the reference value.

According to the mobile robot having the above configuration according to the present disclosure, the mobile robot utilizing the uncertainty of map matching poses for localization is provided, which is capable of estimating the uncertainty of the map-matching pose and evaluating the reliability of the map-matching pose.

Furthermore, the uncertainty of the map-matching pose is considered in estimating the pose of the mobile robot, thereby enabling more accurate pose estimation.

In addition, complementary measurements for pose estimation are integrated with the map-matching pose, thereby enabling precise localization.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
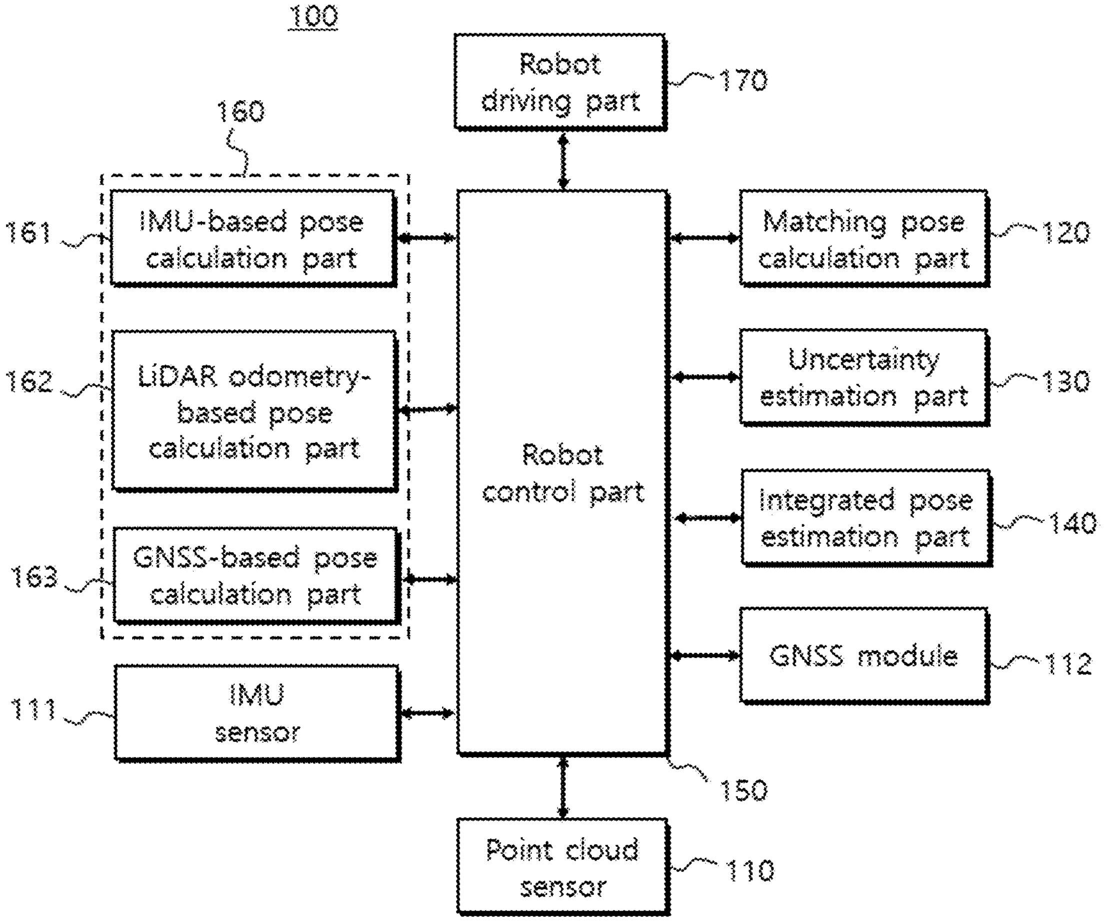
FIG. 1 is a diagram illustrating the configuration of a mobile robot according to an embodiment of the present disclosure.

The advantages and features of the present disclosure, and how to achieve them will be clear by referring to embodiments described in detail below along with the accompanying drawings. However, the present disclosure is not limited to the embodiments disclosed below, but may be implemented in various forms. These embodiments are provided solely to ensure that the disclosure of the present disclosure is complete and to fully inform those skilled in the art to which the present disclosure belongs of the scope of the present disclosure. The present disclosure is only defined by the scope of the claims.

Terms used herein are intended to describe embodiments and are not intended to limit the present disclosure. In this specification, singular forms also include plural forms, unless specifically stated otherwise in the context. As used in the specification, "comprises" and/or "comprising" does not exclude the presence or addition of one or more other elements in addition to mentioned elements. Like reference numerals refer to like elements throughout the specification, and "and/or" includes each and every combination of one or more of the referenced elements. Although "first", "second", etc. are used to describe various components, these components are of course not limited by these terms. These terms are merely used to distinguish one component from another. Accordingly, a first component mentioned below may also be a second component within the technical idea of the present disclosure.

Unless otherwise defined, all terms (including technical and scientific terms) used in this specification may be used to have meanings commonly understood by those skilled in the art to which the present disclosure pertains. Additionally, terms defined in commonly used dictionaries are not interpreted ideally or excessively unless clearly and specifically defined.

FIG. 1 is a diagram illustrating a mobile robot 100 utilizing the uncertainty of map matching poses for localization according to an embodiment of the present disclosure.

Referring to FIG. 1, the mobile robot 100 according to the embodiment of the present disclosure may include a point cloud sensor 110, a matching: calculation part 120, and an uncertainty estimation part 130. In addition, the mobile robot 100 according to the embodiment of the present disclosure may include a robot driving part 170 and a robot control part 150.

The point cloud sensor 110 according to the embodiment of the present disclosure scans a driving environment while the mobile robot 100 is driving and acquires point cloud data. In the embodiment of the present disclosure, the point cloud sensor 110 is a 3D LiDAR sensor as an example, and acquires three-dimensional information of each point cloud. Of course, the point cloud sensor 110 may be provided in the form of a stereo camera.

The robot control part 150 according to the embodiment of the present disclosure may drive the mobile robot 100 manually or automatically according to the manipulation of a user through the control of the robot driving part 170. As an example, the robot driving part 170 may be configured as a two-wheel differential system, but this is only an example and various driving methods may be applied thereto.

The matching pose calculation part 120 according to the embodiment of the present disclosure may calculate a map-matching pose of the mobile robot 100 by applying a pre-registered point cloud map and the point cloud data to a pre-registered scan-map matching algorithm.

In the embodiment of the present disclosure, the matching pose calculation part 120 calculates the map-matching pose by applying a normal distribution transform (NDT) algorithm as the scan-map matching algorithm.

More specifically, the normal distribution transform (NDT) algorithm divides the pre-registered point cloud map into a plurality of voxels. In addition, for each of the voxels, the mean μ and covariance Σ of points of the point cloud map existing in the voxel are calculated to generate an NDT map. Here, the NDT map may be represented as a set of voxels, each voxel containing a mean and a covariance.

When the pose of the point cloud sensor 110, i.e., a LiDAR sensor, is x, the point cloud data scanned by the point cloud sensor 110 is represented as $z=(z_1, z_2 \ldots, z_N)$, the probability of the point cloud data $z_i$ for voxel j of the NDT map m may be defined as in [Mathematical expression 1] and [Mathematical expression 2].

$$p(z_i|x, m) = c_1 \exp\left(-\frac{(z_i' - \mu_j)^T \sum_j^{-1} (z_i' - \mu_j)}{2}\right) + c_2 p_0 \quad \text{[Mathematical expression 1]}$$

$$z_i' = Rz_i + p \quad \text{[Mathematical expression 2]}$$

Here, R and P are a rotation matrix and a translation vector for transforming the coordinates $z_i$ of the point cloud data acquired on the basis of a robot coordinate system into a global coordinate system. In addition, $p_0$ is a ratio of an expected outlier, and $c_1$ and $c_2$ are constants respectively determined by the properties of a probability density function.

In the normal distribution transform (NDT) algorithm, a likelihood is derived as the product of the probabilities of the point cloud data computed from the NDT map, as in an equation expressed by the [Mathematical expression 3].

$$p(z|x, m) = \prod_{i=1}^{N} p(z_i|x, m) \quad \text{[Mathematical expression 3]}$$

Here, the normal distribution transform (NDT) algorithm calculates optimal transformation that maximizes the likelihood as the map-matching pose $\hat{x}$.

Meanwhile, the uncertainty estimation part 130 according to the embodiment of the present disclosure sets a preset pose space (or state space) around the map-matching pose calculated by the matching pose calculation part 120, and estimates the uncertainty of the map-matching pose on the basis of a probability distribution calculated for the corresponding pose space. In an embodiment, the uncertainty estimation part 130 calculates the covariance of the map-matching pose in the pose space as the probability distribution, and estimates the uncertainty of the map-matching pose by using the covariance.

In the embodiment of the present disclosure, the uncertainty estimation part 130 calculates the probability distribution of the pose space by applying a histogram filter algorithm to the pose space.

In one embodiment, the histogram filter algorithm divides the pose space into a plurality of grid cells. Then, the histogram filter algorithm may calculate the posterior probability of each of the grid cells to calculate the probability distribution of the pose space.

In the embodiment of the present disclosure, by considering the mobile robot 100 moving on the ground, the pose space is divided only for x, y, and yaw to calculate the probability distribution of the 2D pose as an example, and this will be described in detail later. In an embodiment, the pose space is set to [−2 m, 2 m]×[−2 m, 2 m]×[−5°, 5°] with a resolution of 0.2 m and 1° for x, y, and yaw.

Here, the uncertainty estimation part 130 may calculate the posterior probability of each grid cell by using the likelihood calculated in the process of calculating the map-matching pose of the scan-map matching algorithm, i.e., the normal distribution transform (NDT) algorithm described above.

In an embodiment, the uncertainty estimation part 130 may calculate the posterior probability of each grid cell by applying Bayes' rule. Here, the posterior probability distribution of the pose space around the map-matching pose $\hat{x}$ according to Bayes' rule may be computed by [Mathematical expression 4].

$$p(\hat{x}|z, m) \propto p(z|\hat{x}, m)p(\hat{x}) \quad \text{[Mathematical expression 4]}$$

[Mathematical expression 4] represents Bayes' theorem, which is a formula for conditional probability, defining that the posterior probability is proportional product of the likelihood and a prior probability.

Here, according to the embodiment of the present disclosure, the uncertainty estimation part 130 estimates the uncertainty by calculating the covariance of the probability distribution for the posterior probabilities of a plurality of grid cells.

Here, the covariance may be calculated by using [Mathematical expression 5].

$$\text{cov}(\hat{x}) = \frac{1}{s}K - \frac{1}{s^2}uu^T \quad \text{[Mathematical expression 5]}$$

In [Mathematical expression 5], $\text{cov}(\hat{x})$ is the covariance for the map-matching pose $\hat{x}$, and K, u, s may be calculated by using [Mathematical expression 6].

$$K = \sum_k \hat{x}_k \hat{x}_k^T p(\hat{x}_k|z, m)^\alpha \quad \text{[Mathematical expression 6]}$$

$$u = \sum_k \hat{x}_k p(\hat{x}_k|z, m)^\alpha$$

$$s = \sum_k p(\hat{x}_k|z, m)^\alpha$$

In [Mathematical expression 6], $\hat{x}_k$ is a pose for a grid cell, $p(\hat{x}_k|z, m)$ is a posterior probability for the pose $\hat{x}_k$ and an exponent $\alpha$ is a constant set to adjust the value of the posterior probability and is a value less than 1.

As in [Mathematical expression 3], since the likelihood is calculated as the product of the probabilities for many point cloud data, the posterior probability tends to be overconfident. Therefore, by introducing the exponent $\alpha$ in the calculation of the covariance, the posterior probability distribution is adjusted.

Figure 2:
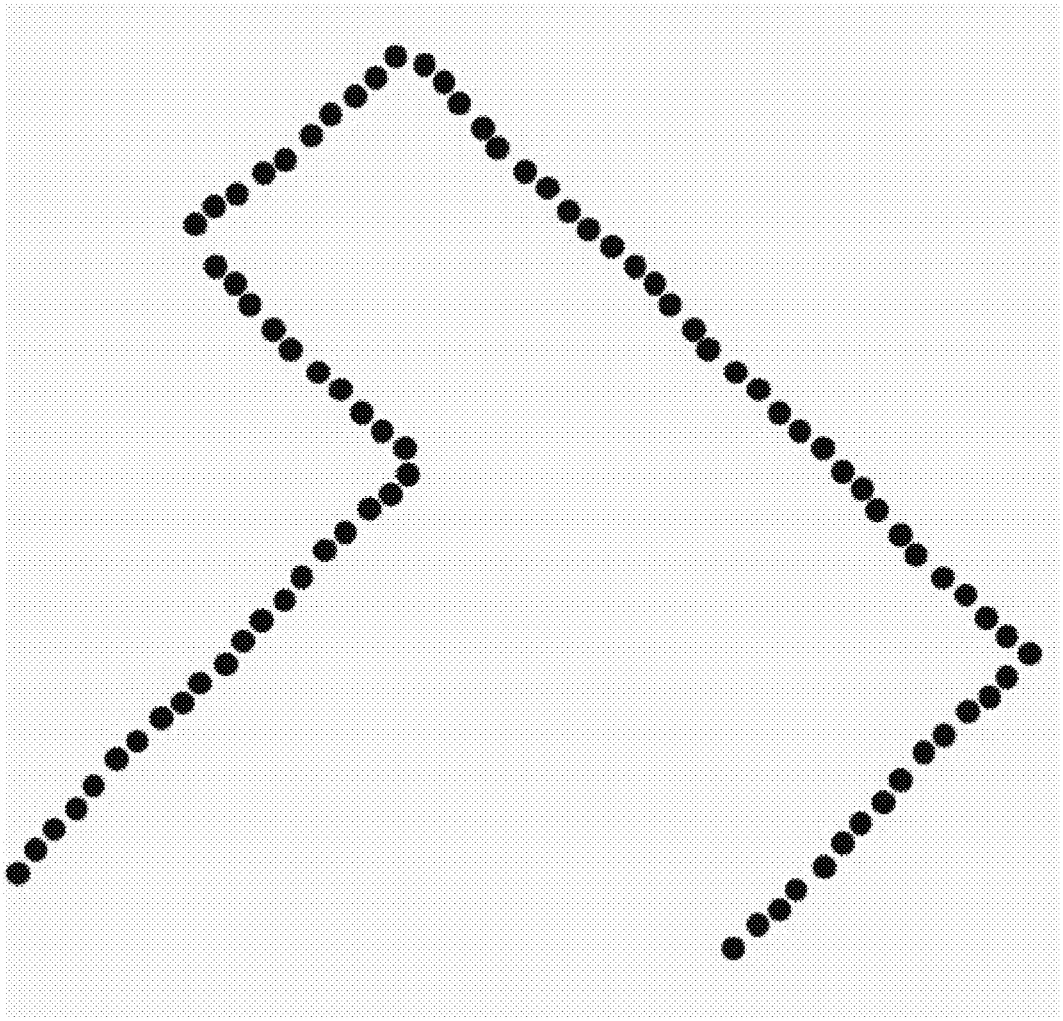
FIGS. 2 to 6 are views illustrating a method for calculating the uncertainty of a map-matching pose of the mobile robot according to the embodiment of the present disclosure.
Figure 3:
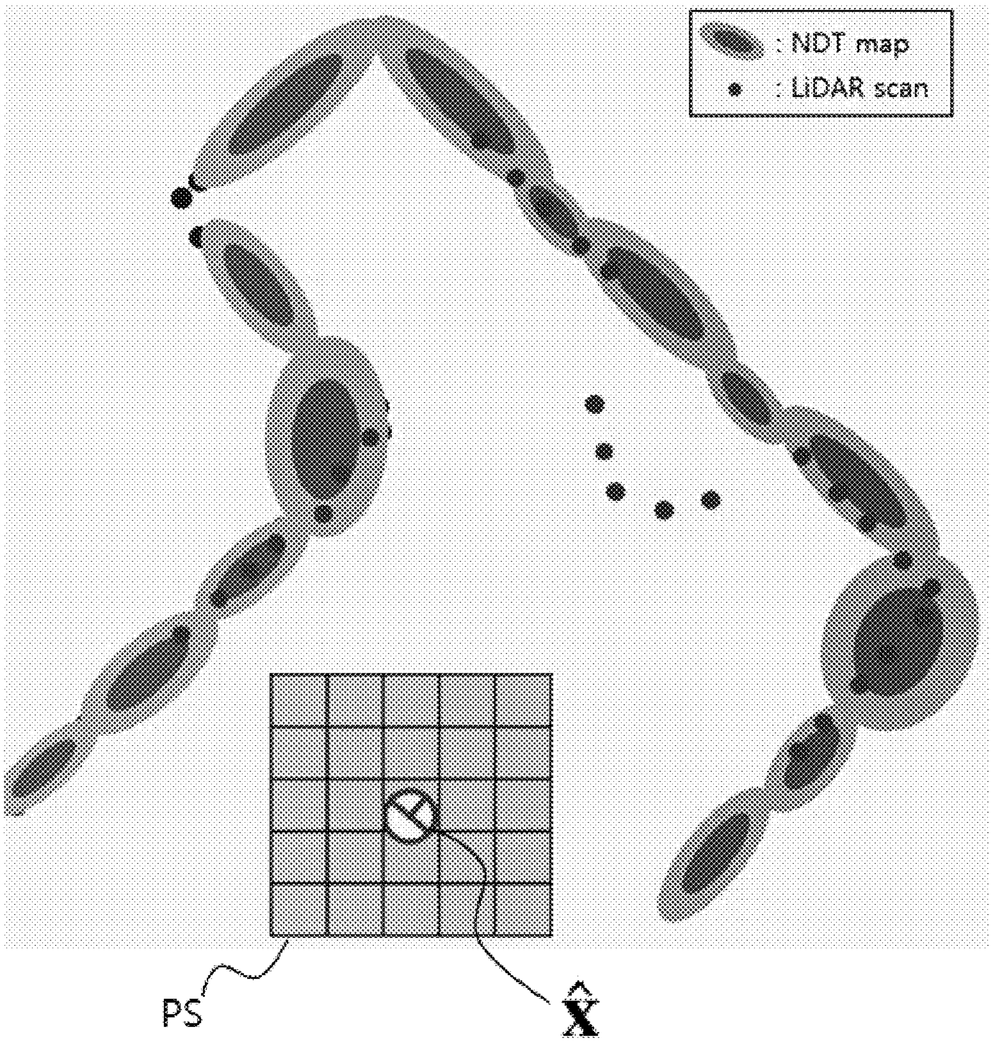

More specifically, referring to FIGS. 2 to 6, FIG. 2 is a view illustrating the pre-registered point cloud map, and FIG. 3 illustrates the NDT map and the pose space generated by the scan-map matching algorithm of the matching pose calculation part 120.

As illustrated in FIGS. 2 and 3, the uncertainty estimation part 130 divides the pose space around the map-matching pose into a plurality of grid cells.

Figure 4:
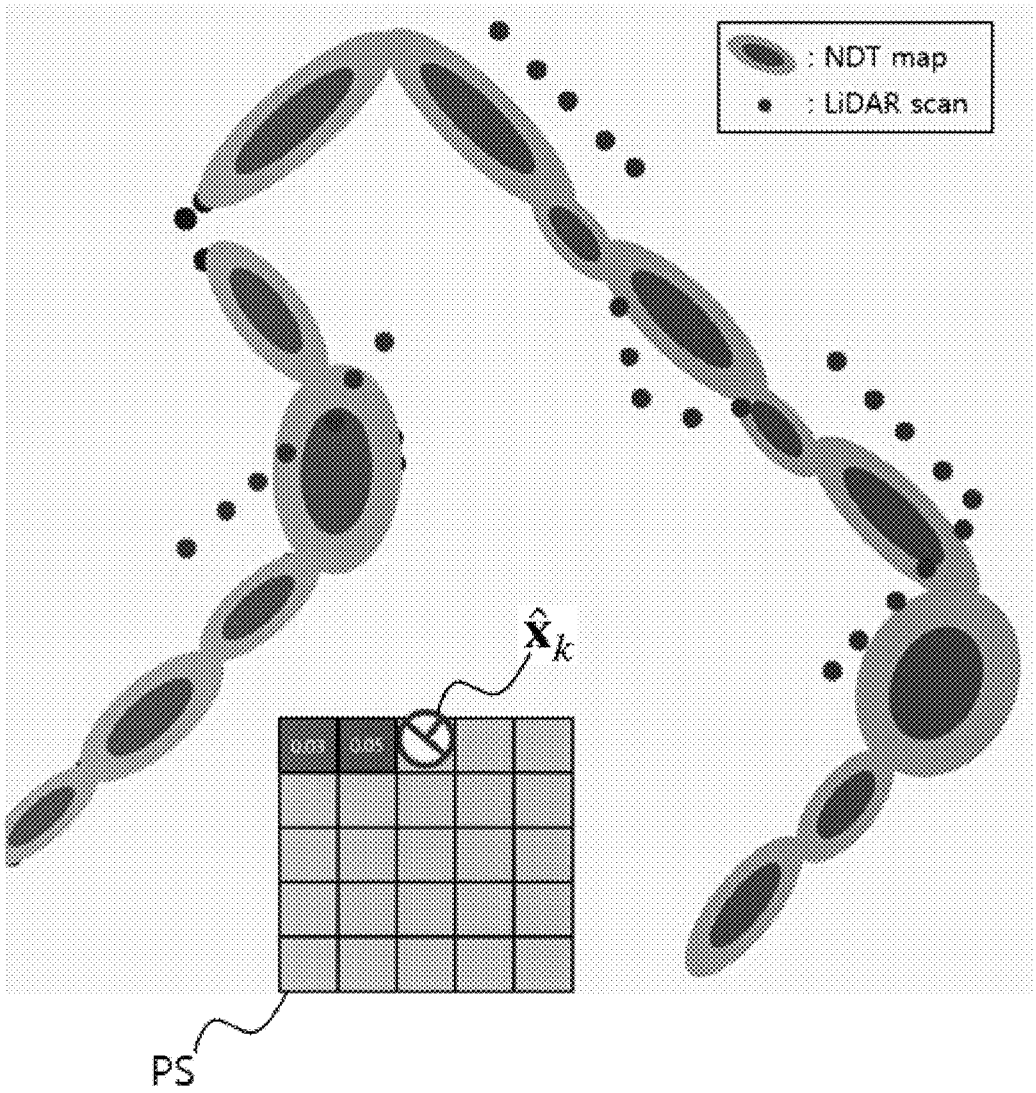
Figure 5:
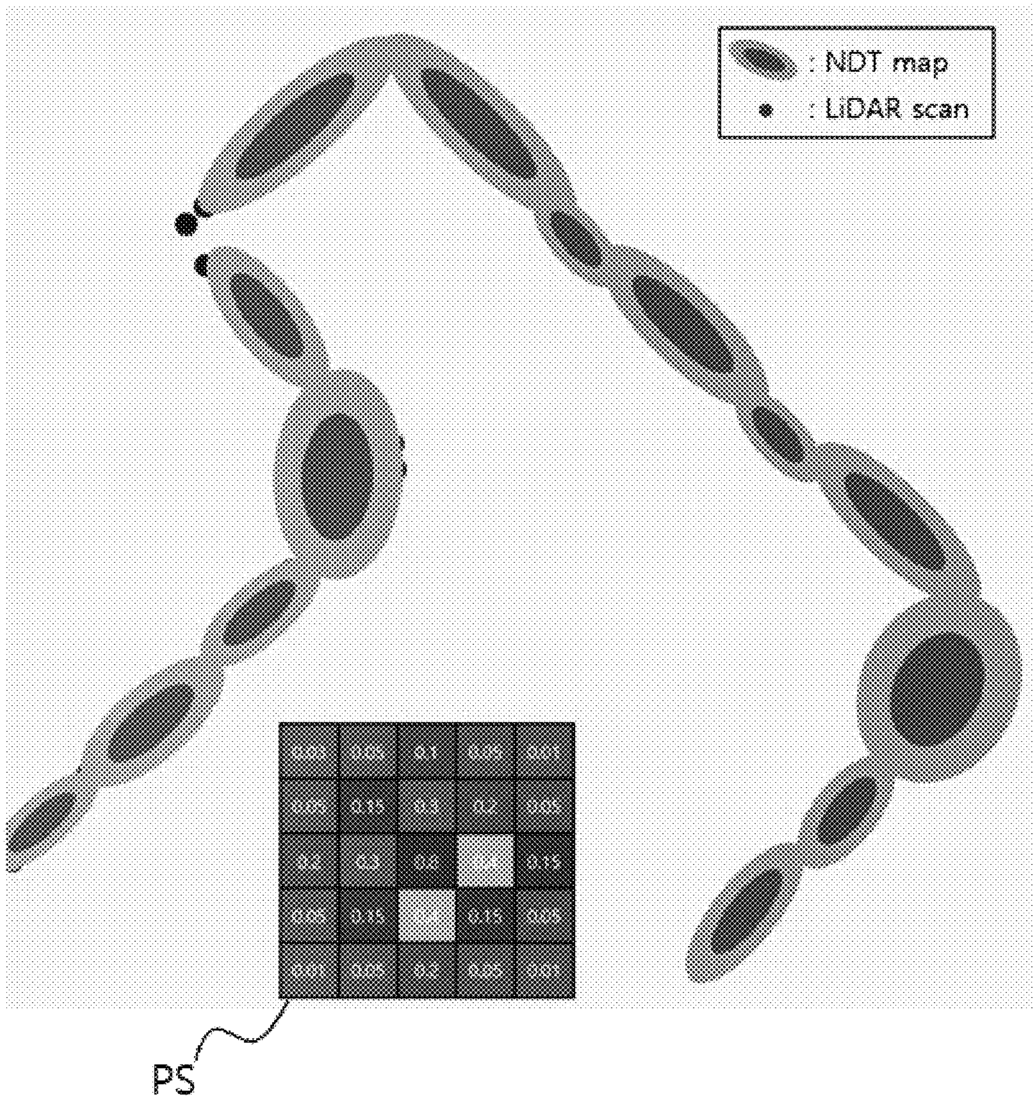
Figure 6:
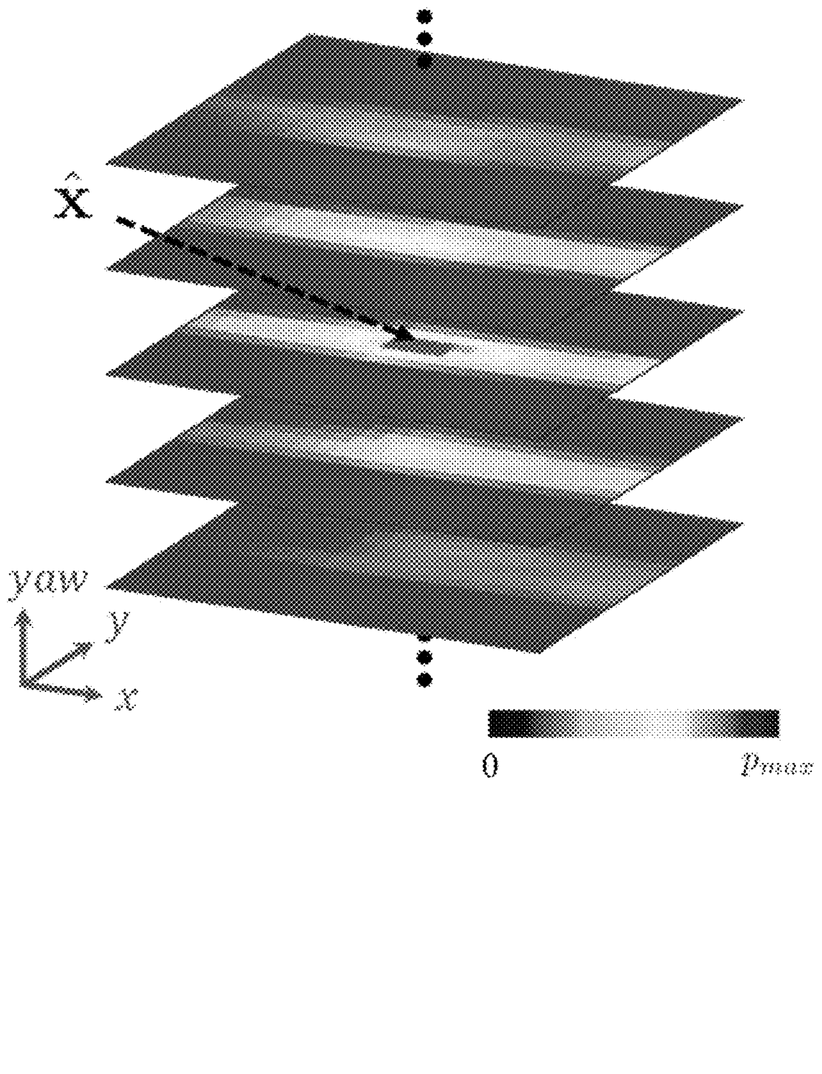

In addition, as illustrated in FIG. 4, the posterior probability of each of the grid cells is calculated by using the Bayes' rule as illustrated in [Mathematical expression 4], and when the posterior probability is calculated for each of all the grid cells, the posterior probability distribution around the map-matching pose is obtained as illustrated in FIG. 5.

In addition, the uncertainty estimation part 130 calculates the covariance of the posterior probability distribution by using [Mathematical expression 5], and estimates the covariance as the uncertainty of the map-matching pose.

In an embodiment, the map-matching pose $\hat{x}$ is represented as $[x, y, z, \phi, \theta, \psi]^T$, wherein x, y, and z are 3D coordinates, respectively, and $\phi$, $\theta$, and $\psi$, which are Euler angles, are roll, pitch, and yaw, respectively.

As described above, the pose space is set to x, y, and $\psi$, and the diagonal element of the covariance for z for the map-matching pose $\hat{x}$ may be assigned on the basis of the diagonal elements of x and y, and diagonal elements for $\phi$ and $\theta$ may be assigned on the basis of the diagonal element of $\psi$.

In an embodiment, when the diagonal elements of the covariance are represented as $$[\sigma_x^2, \sigma_y^2, \sigma_z^2, \sigma_\phi^2, \sigma_\theta^2, \sigma_\psi^2],$$

the pose space is set to a 2D pose, and thus the covariance does not include information about $$\sigma_z^2, \sigma_\phi^2, \text{ and } \sigma_\theta^2.$$

Accordingly, to estimate the uncertainty of the 6-DOF pose, the covariance is set as $$\sigma_z^2 = \eta_1(\sigma_x^2 + \sigma_y^2) \text{ and } \sigma_\phi^2 = \sigma_\theta^2 = \eta_2\sigma_\psi^2$$

as an example.

Referring back to FIG. 1, the mobile robot 100 according to the embodiment of the present disclosure may include at least one individual pose calculation part 160 and an integrated pose estimation part 140.

The individual pose calculation part 160 according to the embodiment of the present disclosure may calculate the pose of the mobile robot 100 in the same manner as the matching pose calculation part 120.

In addition, the integrated pose estimation part 140 may estimate the integrated pose of the mobile robot 100 on the basis of a map-matching pose calculated by the matching pose calculation part 120 and a pose calculated by the individual pose calculation part 160. Here, the integrated pose estimation part 140 may estimate the integrated pose by considering uncertainty estimated by the uncertainty estimation part 130.

In the embodiment of the present disclosure, the integrated pose estimation part 140 estimates the integrated pose by using a factor graph which uses the pose calculated by the individual pose calculation part 160 and the map-matching pose as constraints.

Here, for operational efficiency, sliding window optimization is applied, and the factor graph is applied to the latest key frame of a preset size (number) as an example.

Meanwhile, the mobile robot 100 according to the embodiment of the present disclosure may include an IMU sensor 111 and a GNSS module 112.

The IMU sensor 111 may measure linear acceleration and an angular velocity according to the movement of the mobile robot 100. In addition, the GNSS module 112 may measure GNSS-based position information.

Here, the individual pose calculation part 160 may include an IMU-based pose calculation part 161, a LiDAR odometry-based pose calculation part 162, and a GNSS-based pose calculation part 163.

The IMU-based pose calculation part 161 may calculate a local pose for each of key points to be input into the factor graph, i.e., each node of the factor graph on the basis of the linear acceleration and the angular velocity measured by the IMU sensor 111. In addition, the LiDAR odometry-based pose calculation part 162 compares point cloud data between one adjacent pair of the key points by using point cloud data acquired by the point cloud sensor 110 and calculates relative change in pose between the key points. In addition, the GNSS-based pose calculation part 163 converts the position information measured by the GNSS module 112 into coordinate information on the point cloud map to calculate a GNSS global pose.

Here, the IMU-based pose calculation part 161 and the LiDAR odometry-based pose calculation part 162 estimate the pose of the mobile robot 100 through LiDAR-inertial odometry, wherein the map-matching pose is applied to estimate the global pose of the mobile robot 100, and the GNSS global pose complements this estimation.

To be more specific, the state X of the mobile robot 100, which is set as a node of the factor graph, i.e., a key frame, may be set as in [Mathematical expression 7].

$$X = [R^T, p^T, v^T, b^T]^T \quad \text{[Mathematical expression 7]}$$

As explained above, R represents the direction of the mobile robot 100 as a rotation matrix (3×3), and p represents the position (3×1) of the mobile robot 100 as a translation vector. In addition, v represents the linear velocity (3×1) of the mobile robot 100, and b is the bias (6×1) of the IMU sensor 111, which is an offset of a predetermined value for the linear acceleration and the angular velocity estimated by the IMU sensor 111.

The IMU-based pose calculation part 161 may calculate the local pose for each key point by preprocessing and integrating the linear acceleration and the angular velocity measured by the IMU sensor 111.

Typically, the IMU sensor 111 measures the linear acceleration and the angular velocity at high frequency. When all of these high-speed measurement data is applied to optimization of the factor graph, there is a problem that the amount of computation increases. Accordingly, the IMU-based pose calculation part 161 integrates the linear acceleration and the angular velocity, which are received at a high frequency from the IMU sensor 111, at a low frequency, e.g., on a keyframe basis, and calculates the local pose.

In an embodiment, the integrated pose estimation part 140 may apply the uncertainty calculated for the map-matching pose as a weight of the map-matching pose for the estimation of the integrated pose. In addition, the integrated pose estimation part 140 may not consider the corresponding map-matching pose in the estimation of the integrated pose when the uncertainty of the map-matching pose is greater than a preset reference value.

Here, the integrated pose estimation part 140 compares the sum of the x-direction component and the y-direction component of the uncertainty of [Mathematical expression 5], i.e., the covariance with the reference value, so that only a map-matching pose that is less than or equal to the reference value may be considered in the estimation of the integrated pose. This may be expressed as [Mathematical expression 8].

$$\sigma_x^2 + \sigma_y^2 > \sigma_{th}^2 \quad \text{[Mathematical expression 8]}$$

Here, $$\sigma_x^2$$

is an x-direction component of the covariance, $$\sigma_y^2$$

is a y-direction component of the covariance, and $$\sigma_{th}^2$$

is a reference value.

According to the integrated pose estimated through the above method, the robot control part 150 controls the robot driving part 170 to control the translation of the mobile robot 100.

Below, the results of the driving experiment of the mobile robot 100 according to the embodiment of the present disclosure are described.

First, in the uncertainty estimation experiment, the point cloud map used in the experiment was a map constructed seventeen months prior to the experiment. In addition, ground truth information about the uncertainty of the map-matching pose was required, and a Monte Carlo algorithm was used in the experiment.

The Monte Carlo algorithm may accurately estimate the uncertainty of the environment by performing scan matching with multiple sampled initial poses to obtain a converged distribution. Accordingly, in the present disclosure, the uncertainty obtained through Monte Carlo sampling was used as measured uncertainty and compared with the uncertainty estimated by the mobile robot 100 according to the embodiment of the present disclosure.

A sampled covariance was computed on the basis of 1000 initial poses sampled around a ground truth pose and the map-matching pose calculated according to the embodiment of the present disclosure. To eliminate the influence of the initial pose distribution, samples were extracted from a uniform distribution, and sampling was performed in the range of ±2 m and ±5° for x, y, and yaw, which is the same as the size of the pose space according to the embodiment of the present disclosure.

The results of uncertainty estimation for various environments are illustrated in FIGS. 7 and 8. The uncertainty of the map-matching poses for six regions was analyzed.

Figure 7A:
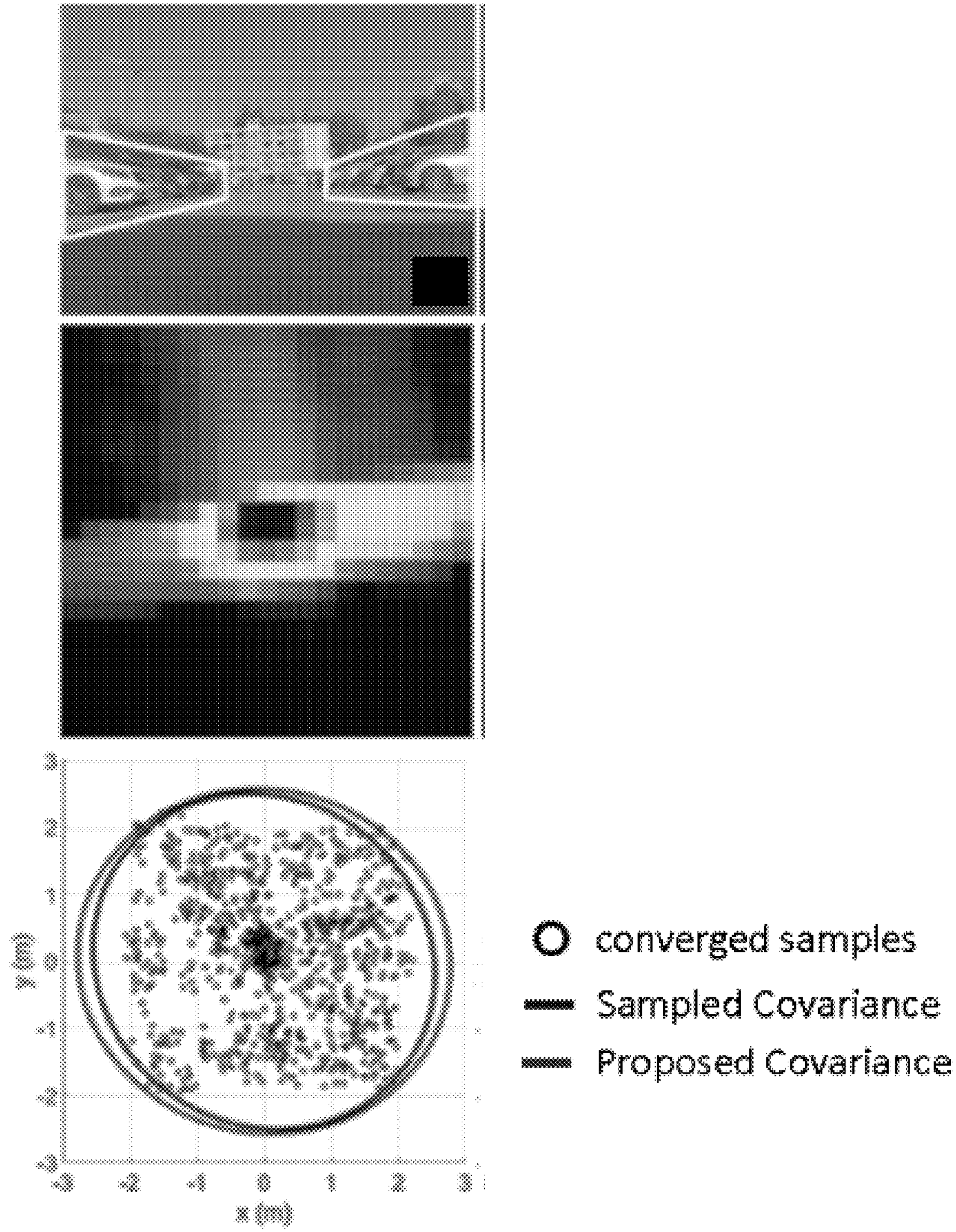
FIGS. 7 to 9 are views illustrating experimental results of the mobile robot according to the embodiment of the present disclosure.
Figure 7B:
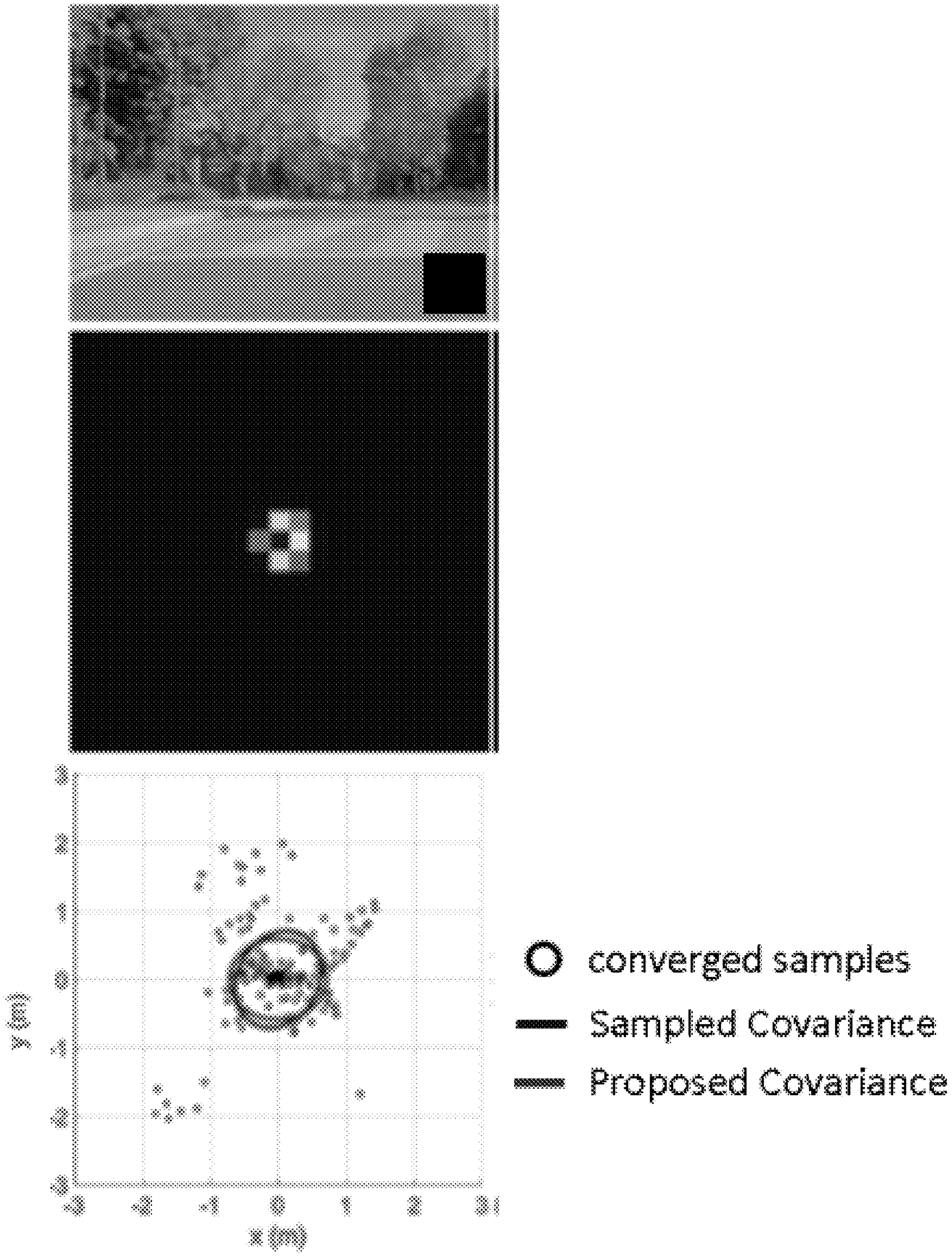
Figure 8A:
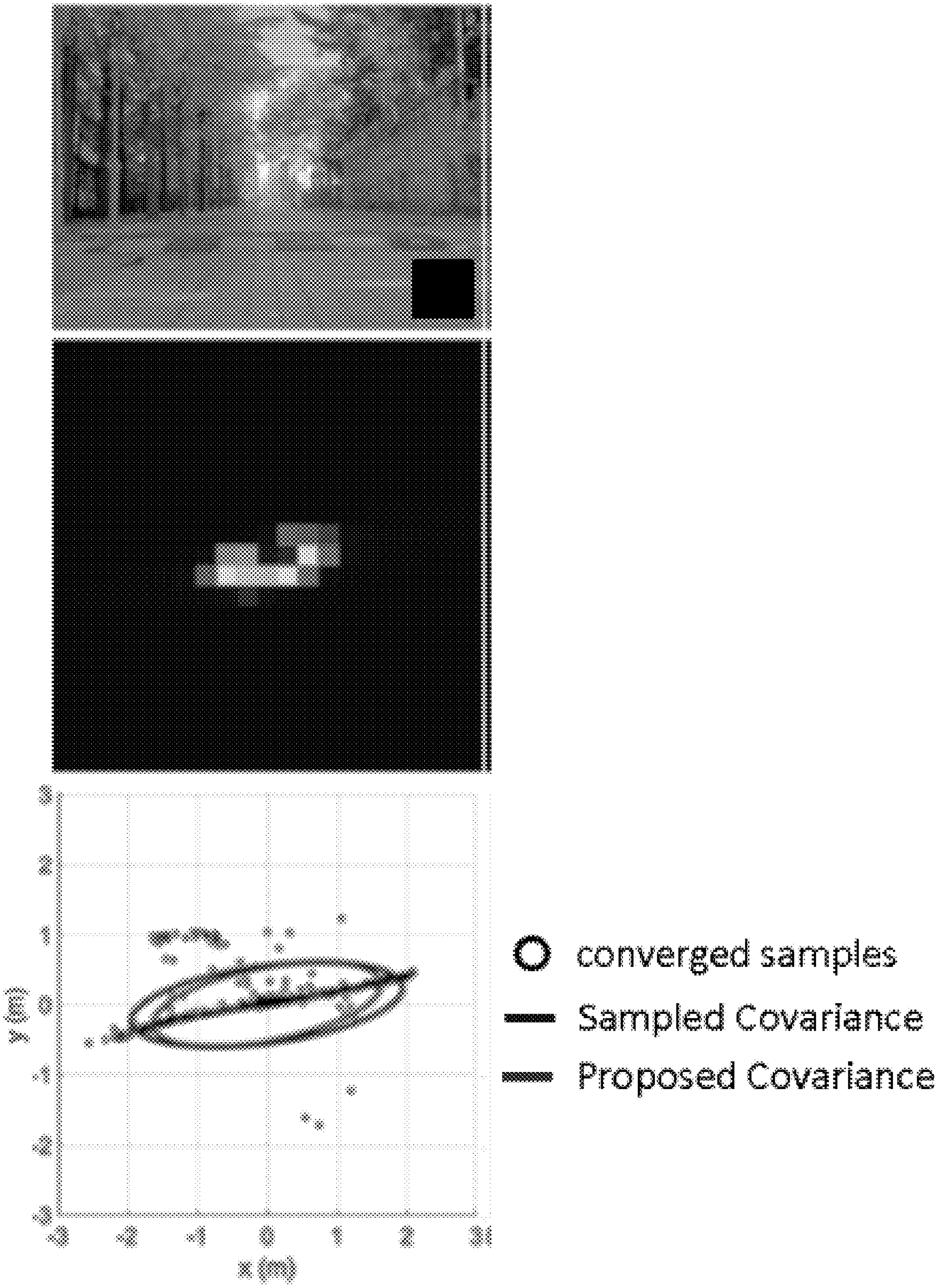

As illustrated in FIG. 7B, the map-matching pose was estimated to have low uncertainty in regions rich in geometric features. In contrast, as illustrated in FIGS. 8A and 8C, in regions with repetitive geometric structures in a driving direction, a covariance ellipse was estimated to be elongated.

Figure 7C:
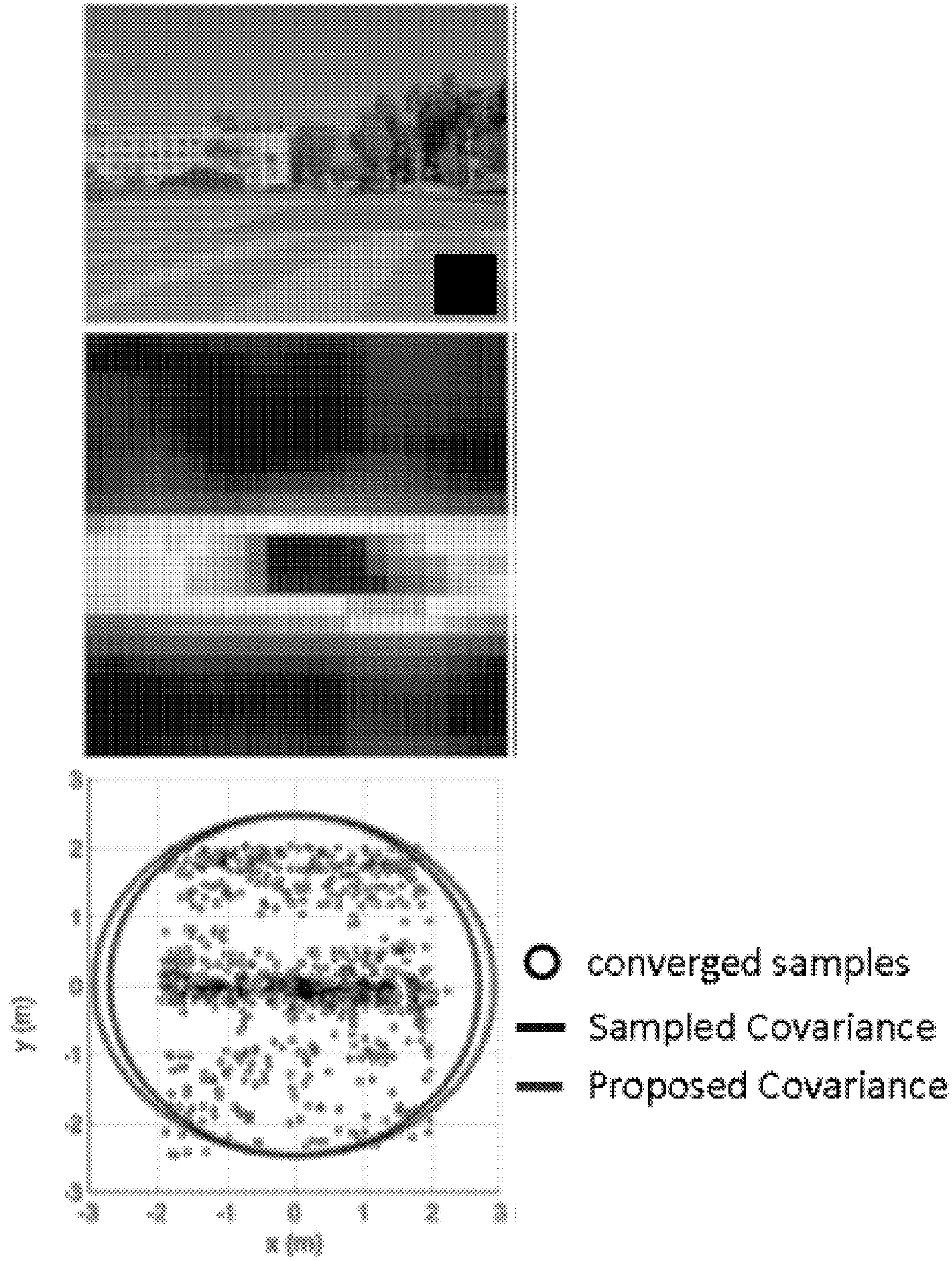
Figure 8B:
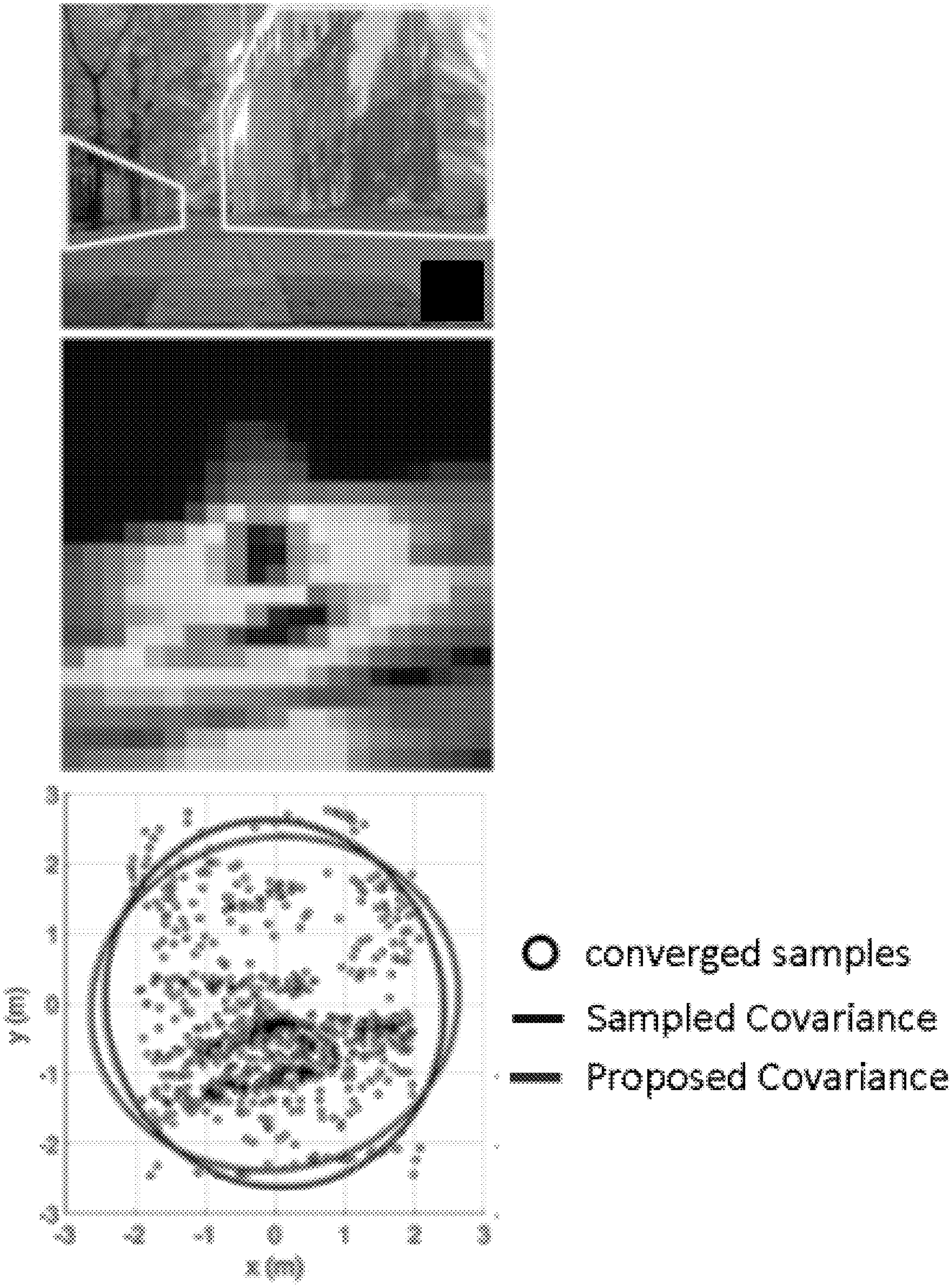
Figure 8C:
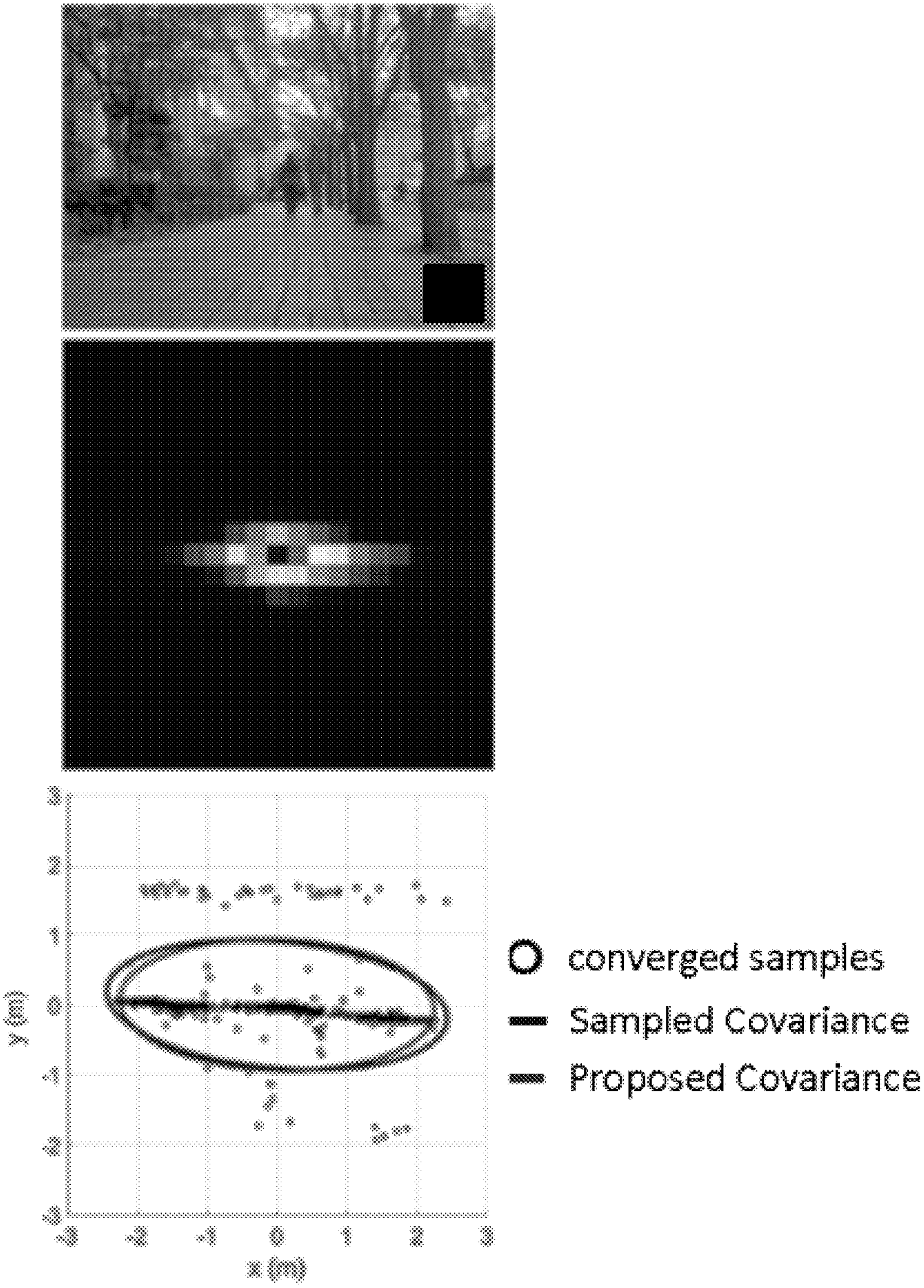

The region shown in FIG. 7A is a parking lot in which a vehicle that is not shown in the point cloud map is parked, and the region shown in FIG. 8B is a new construction site. The region shown in FIG. 7C lacks features in the front and has parking lots on both sides.

The uncertainty estimation method according to the embodiment of the present disclosure predicted a decrease in the accuracy of map matching by estimating high uncertainty in regions in which features were lacking or the environment was changed.

Meanwhile, the localization performance of the mobile robot 100 according to the embodiment of the present disclosure was tested. For the experiment, the comparison and evaluation of the localization method of the present disclosure with three existing LiDAR-based localization methods were performed, and the three methods are as follows.

The first method is LIO-SAM (LIO-SAM+GNSS) using GNSS, which corrects a global pose at a predetermined interval by using GNSS. The second method is HDL localization, which integrates IMU measurements with map-matching poses obtained through NDT by using unscented Kalman filter. The last method is FAST-LIO an localization, which estimates a local location by using FAST-LIO.

Figure 9:
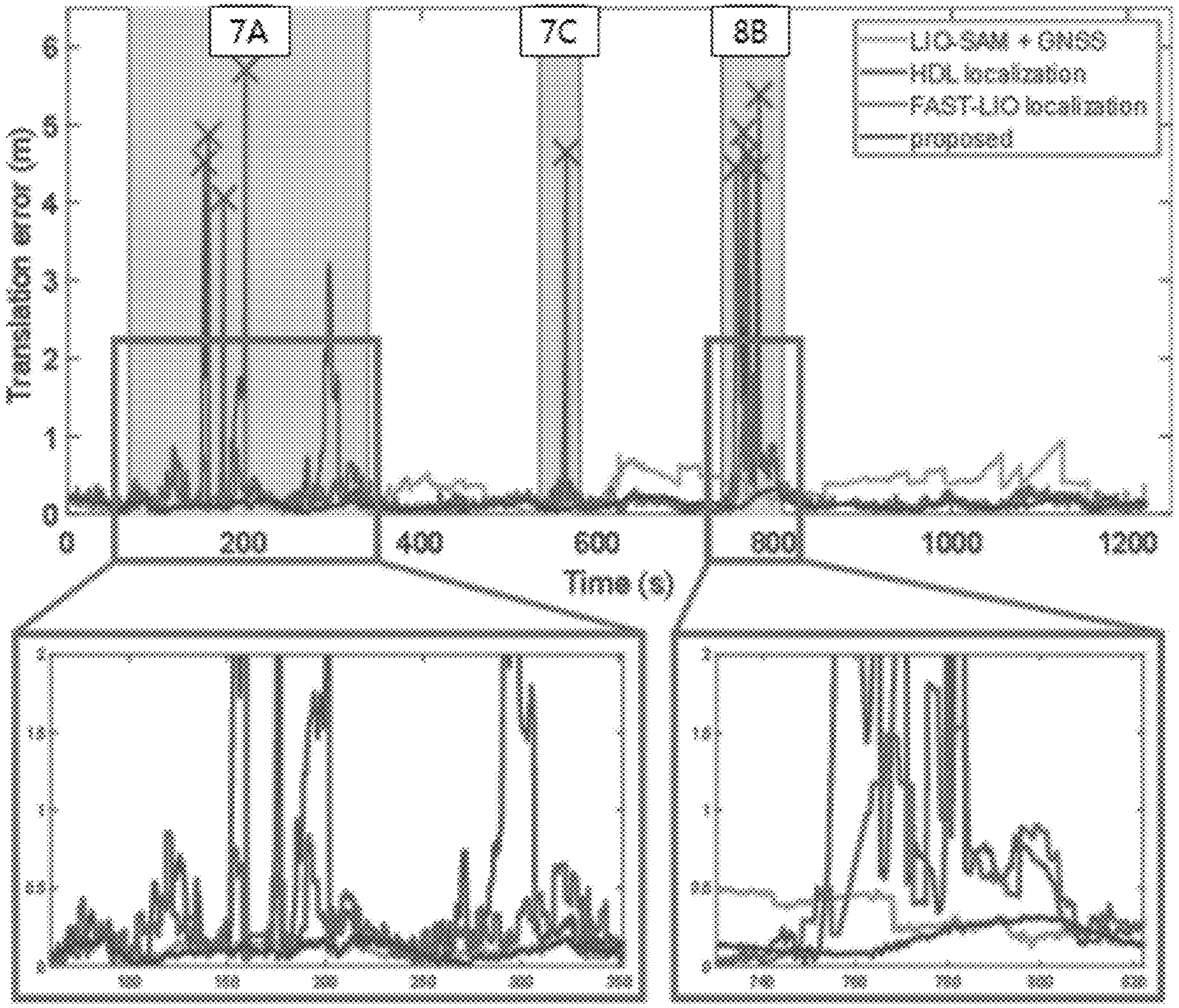

Considering that the mobile robot 100 moves on the ground, the localization performance is evaluated by a transformation error for a 2D pose. FIG. 9 shows an error of each method according to driving time. The experiment illustrated in FIG. 9, like the previous experiments in FIGS. 7A, 7B, 7C, 8A, 8B, and 8C, used the point cloud map constructed 17 months ago and includes regions illustrated in FIGS. 7A, 7B, 7C, 8A, 8B, and 8C.

The HDL localization method experienced various failures in the regions of FIGS. 7A, 7C, and 8B, resulting in deteriorated map matching performance. Likewise, in the same region, the FAST-LIO localization method also showed a significant increase in error due to the use of an inaccurate pose for attitude correction.

On the other hand, the localization method according to the embodiment of the present disclosure accurately predicted that the uncertainty of map matching was large in the same region in FIGS. 7A, 7B, 7C, and 9, and the accuracy of localization could be maintained by utilizing the estimated uncertainty, i.e., covariance.

In addition, the localization method according to the embodiment of the present disclosure was confirmed to accurately estimate a pose by excluding GNSS outliers and utilizing GNSS and map matching even in an environment with large GNSS errors.

Although the preferred embodiments of the present disclosure have been described in detail above, the scope of the present disclosure is not limited thereto, and various modifications and improvements made by those skilled in the art using the basic concept of the present disclosure defined in the following claims also fall within the scope of the present disclosure.

What is claimed is:

1. A mobile robot utilizing uncertainty of map matching poses for localization, the mobile robot comprising:

a point cloud sensor configured to acquire point cloud data through scanning;

a matching pose calculation part configured to apply a pre-registered point cloud map and the point cloud data to a pre-registered scan-map matching algorithm to calculate a map-matching pose of the mobile robot; and an uncertainty estimation part configured to estimate uncertainty of the map-matching pose on the basis of a probability distribution of a preset pose space around the map-matching pose, wherein the uncertainty estimation part calculates the probability distribution of the pose space by applying a histogram filter algorithm to the pose space, wherein the histogram filter algorithm divides the pose space into a plurality of grid cells, and calculates a posterior probability of each of the grid cells to calculate the probability distribution of the pose space, wherein the uncertainty estimation part estimates the uncertainty by calculating a covariance of the probability distribution for the posterior probability of the plurality of grid cells, and wherein the covariance is calculated by mathematical expression $$\mathrm{cov}(\hat{x}) = \frac{1}{s}K - \frac{1}{s^2}uu^T$$

(Here, $\mathrm{cov}(\hat{x})$ is the covariance for the map-matching pose $\hat{x}$, and K, u, and s are calculated by mathematical expression $$K = \sum_k \hat{x}_k \hat{x}_k^T p(\hat{x}_k \mid z, m)^\alpha$$

$$u = \sum_k \hat{x}_k p(\hat{x}_k \mid z, m)^\alpha$$

$$s = \sum_k p(\hat{x}_k \mid z, m)^\alpha,$$

wherein $\hat{x}_k$ is a pose for the grid cell, $p(\hat{x}_k|z, m)$ posterior probability for the pose $\hat{x}_k$, and an exponent α, which is a constant set to adjust a value of the posterior probability, is a value less than 1).

2. The mobile robot of claim 1, wherein the matching pose calculation part calculates the map-matching pose by applying a normal distribution transform (NDT) algorithm as the scan-map matching algorithm.

3. The mobile robot of claim 1, wherein the uncertainty estimation part calculates the posterior probability of each of the grid cells by using a likelihood calculated in the process of calculating the map-matching pose of the scan-map matching algorithm.

4. The mobile robot of claim 3, wherein the uncertainty estimation part calculates the posterior probability of each of the grid cells by applying Bayes' rule.

5. The mobile robot of claim 1, wherein the map-matching pose $\hat{x}$ is represented as $[x, y, z, \phi, \theta, \psi]^T$, wherein x, y, and z are 3D coordinates, respectively, and φ, θ, and ψ, which are Euler angles, are roll, pitch, and yaw, respectively; and the pose space is set to x, y, and ψ, wherein a diagonal element of the covariance for z for the map-matching pose $\hat{x}$ is assigned on the basis of diagonal elements of x and y, and diagonal elements for φ and θ are assigned on the basis of a diagonal element of ψ.

6. The mobile robot of claim 1, further comprising:

at least one individual pose calculation part configured to calculate the pose of the mobile robot in a different manner from the matching pose calculation part; and an integrated pose estimation part configured to estimate an integrated pose of the mobile robot on the basis of the map-matching pose calculated by the matching pose calculation part and the pose calculated by the individual pose calculation part, wherein the uncertainty estimated by the uncertainty estimation part is considered in the integrated pose.

7. The mobile robot of claim 6, wherein the integrated pose estimation part estimates the integrated pose by using a factor graph which uses the pose calculated by the individual pose calculation part and the map-matching pose as constraints.

8. The mobile robot of claim 7, further comprising:

an IMU sensor configured to measure linear acceleration and an angular velocity, and a GNSS module configured to measure GNSS-based position information, wherein the individual pose calculation part comprises:

an IMU-based pose calculation part configured to calculate a local pose for each of key points to be input into the factor graph on the basis of the linear acceleration and the angular velocity measured by the IMU sensor;

a LiDAR odometry-based pose calculation part configured to compare the point cloud data between one adjacent pair of the key points, and calculate relative change in pose between the key points; and a GNSS-based pose calculation part configured to convert the position information measured by the GNSS module into coordinate information on the point cloud map to calculate a GNSS global pose, wherein the integrated pose estimation part estimates the integrated pose by using the local pose, the relative change, the GNSS global pose, and the map-matching pose as constraints of the factor graph.

9. The mobile robot of claim 8, wherein the integrated pose estimation part applies the uncertainty calculated for the map-matching pose as a weight of the map-matching pose for the estimation of the integrated pose.

10. The mobile robot of claim 9, wherein the integrated pose estimation part does not consider the corresponding map-matching pose in the estimation of the integrated pose when the uncertainty of the map-matching pose is greater than a preset reference value.

11. The mobile robot of claim 10, wherein the integrated pose estimation part compares a sum of an x-axis direction component and a y-axis direction component of the uncertainty with the reference value.

* * * * *